(12) United States Patent
Escudero Hernández

(10) Patent No.: US 12,092,169 B2
(45) Date of Patent: Sep. 17, 2024

(54) JOINT ASSEMBLY FOR A VEHICLE

(71) Applicant: NISSAN NORTH AMERICA, INC., Franklin, TN (US)

(72) Inventor: Diego Eder Escudero Hernández, Estado de Mexico (MX)

(73) Assignee: Nissan North America, Inc., Franklin, TN (US)

( * ) Notice: Subject to any disclaimer, the term of this patent is extended or adjusted under 35 U.S.C. 154(b) by 461 days.

(21) Appl. No.: 17/515,276

(22) Filed: Oct. 29, 2021

(65) Prior Publication Data

US 2023/0137620 A1     May 4, 2023

(51) Int. Cl.
*F16D 3/223*     (2011.01)

(52) U.S. Cl.
CPC .... *F16D 3/223* (2013.01); *F16D 2003/22313* (2013.01); *F16D 2300/12* (2013.01); *Y10S 464/905* (2013.01); *Y10T 403/1608* (2015.01)

(58) Field of Classification Search
CPC ........... F16D 3/223; F16D 2003/22313; F16D 2300/12; Y10S 464/905; Y10T 403/1608

USPC ................................ 464/111; 403/12, 109.6
See application file for complete search history.

(56) References Cited

U.S. PATENT DOCUMENTS

| | | | | |
|---|---|---|---|---|
| 2,441,265 | A | * | 5/1948 | Frye .......................... F16C 3/02 464/162 |
| 4,523,871 | A | * | 6/1985 | Recker .................... F16D 1/116 403/12 |
| 5,433,668 | A | * | 7/1995 | Harz ....................... F16D 3/224 464/906 |

* cited by examiner

*Primary Examiner* — Greg Binda
(74) *Attorney, Agent, or Firm* — Global IP Counselors, LLP

(57) ABSTRACT

A joint assembly for a vehicle includes an outer race, a fitting, a cap and a stop member. The fitting is disposed in the outer race. The fitting is configured to be axially movable and rotationally fixed relative to the outer race. The cap is connected to the outer race. The stop member is removably received by the cap. The stop member substantially prevents axial movement of the fitting in a direction toward the cap.

18 Claims, 6 Drawing Sheets

JOINT ASSEMBLY FOR A VEHICLE

BACKGROUND

Technical Field

The present disclosure generally relates to a joint assembly for a vehicle. More specifically, the present disclosure relates to a stop member that substantially prevents axial movement of a fitting of a joint assembly for a vehicle.

Background Information

A conventional joint assembly 10 for a vehicle includes a fitting 12 received by an outer race 14, as shown in FIG. 1. The fitting 12 is axially movable relative to the outer race 14. The fitting 12 receives a drive shaft 16. A boot 18 is connected to the drive shaft 16 and to the outer race 14. During assembly of the vehicle, the fitting 12 can move axially within the outer race 14 and contact the boot 18, thereby damaging the joint assembly 10.

SUMMARY

A need exists for a joint assembly for a vehicle in which axial movement of a fitting is substantially prevented during assembly of the vehicle.

In view of the state of the known technology, one aspect of the present disclosure is to provide a joint assembly for a vehicle. The joint assembly includes an outer race, a fitting, a cap and a stop member. The fitting is disposed in the outer race. The fitting is configured to be axially movable and rotationally fixed relative to the outer race. The cap is connected to the outer race. The stop member is removably received by the cap. The stop member substantially prevents axial movement of the fitting in a direction toward the cap.

Another aspect of the present disclosure is to provide a joint assembly for a vehicle in which the joint assembly includes an outer race and a fitting disposed in the outer race. The fitting has a splined opening. The fitting is configured to be axially movable and rotationally fixed relative to the outer race. A cap is connected to the outer race. A stop member is removably received by the cap. The stop member substantially prevents axial movement of the fitting in a direction toward the cap. A gate is movably received by a first slot in the outer race. A biasing member biases the gate to a first position contacting the stop member when the stop member is received by the cap. A splined shaft is received by the opening in the fitting. A boot has a first end connected to the shaft and a second end connected to the cap. A lubricating material is disposed in a cavity defined by the shaft, the outer race, the cap and the boot.

Also other objects, features, aspects and advantages of the disclosed joint assembly for a vehicle will become apparent to those skilled in the art from the following detailed description, which, taken in conjunction with the annexed drawings, discloses exemplary embodiments of the joint assembly for a vehicle.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
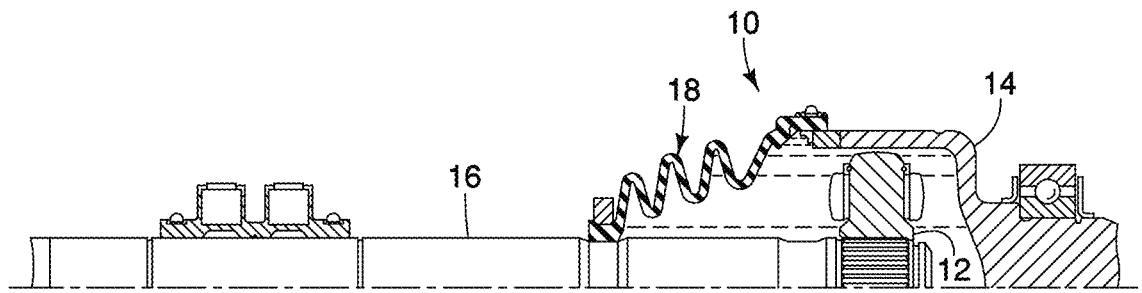
FIG. 1 is an elevational view of a conventional joint assembly for a vehicle.
Figure 2:
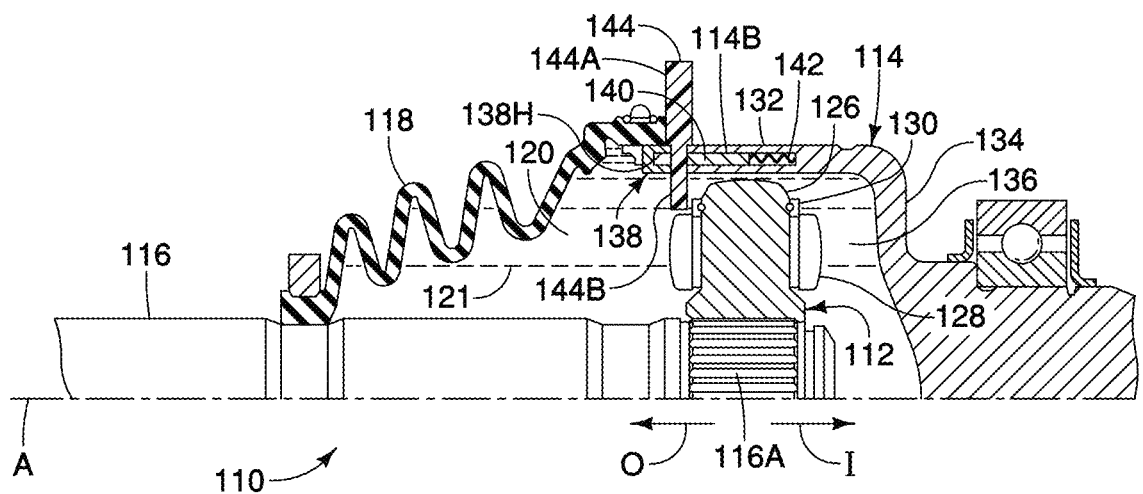
FIG. 2 is an elevational view of a joint assembly for a vehicle in accordance with an exemplary embodiment.

Referring initially to FIG. 2, a joint assembly 110, such as a constant velocity joint, is illustrated in accordance with an exemplary embodiment of the present disclosure. The joint assembly 110 includes a fitting 112 disposed in an outer race 114. The fitting 112 is configured to be axially movable and rotationally fixed relative to the outer race 114. A splined, or drive, shaft 116 is received by the fitting 112 such that rotation of the outer race 114 is transferred to the drive shaft 116 by the fitting 112. A boot 118 is connected to drive shaft 116 and to the outer race 114. A cavity 120 is defined by the drive shaft 116, the boot 118, the outer race 114 and the cap 138. A lubricating material 121 is disposed in the cavity 120 to lubricate the joint assembly 110.

Figure 3:
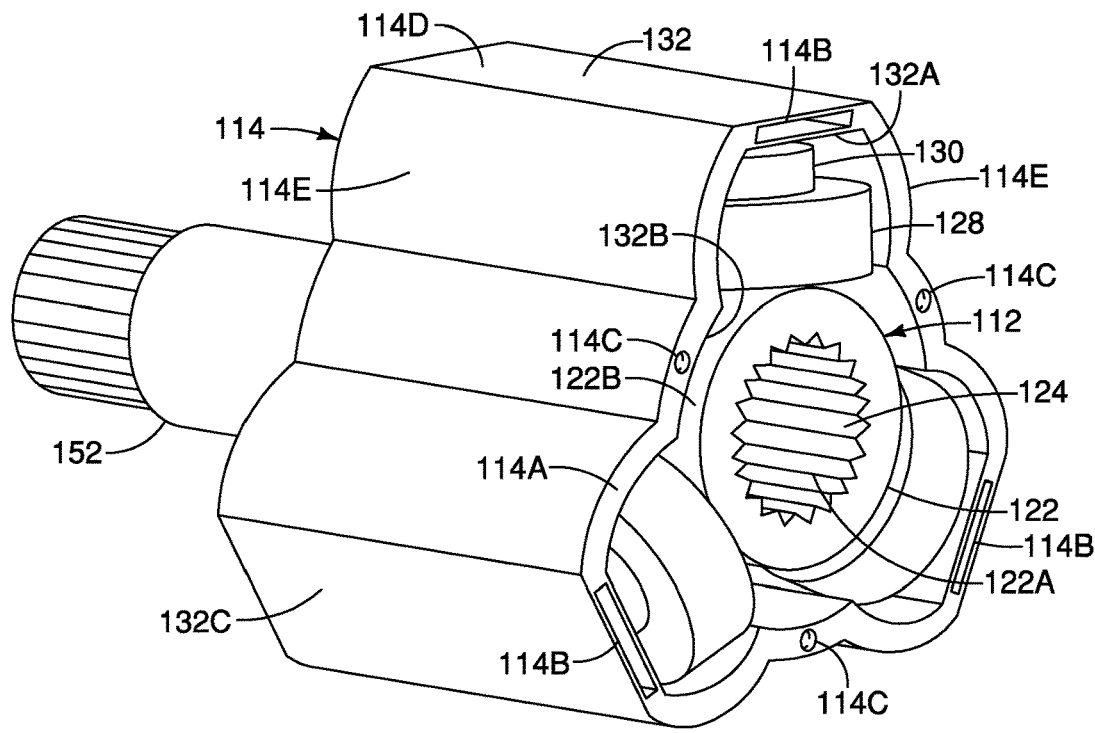
FIG. 3 is a perspective view of an outer race receiving a fitting of the joint assembly of FIG. 2.

The fitting 112 includes a spider support member, or yoke, 122 having an inner surface 122A and an outer surface 122B, as shown in FIG. 3. The inner surface 122A defines an opening 124 that receives the drive shaft 116. The inner surface 122A is preferably splined to receive a splined end 116A of the drive shaft 116 to rotationally fix the drive shaft 116 to the spider support member 122 of the fitting 112, as shown in FIGS. 2 and 3. A plurality of trunnions 126 extend outwardly from the outer surface 122B of the spider support member 122. The fitting 112 is preferably a tripod joint, such that three trunnions 126 extend outwardly from the outer surface 122B of the spider support member 122. A roller 128 is rotatably received by each of the trunnions 126. A needle bearing 130 is disposed between the trunnion 126 and the roller 128 to allow the roller 128 to rotate with respect to the trunnion 126.

The outer race 114 includes a wall 132 that extends axially from a base 134, as shown in FIGS. 2 and 3. The base 134 extends substantially perpendicularly to a rotational axis A of the drive shaft 116. The wall 132 extends substantially parallel to the rotational axis A of the drive shaft 116. The base 134 and the wall 132 of the outer race 114 define a receiving area 136 within which the fitting 112 is axially movable. A plurality of grooves 132A are formed in an inner surface 132B of the wall 132 of the outer race 114 to receive the rollers 128 of the fitting 112. The outer race 114 is preferably made of a metallic material, such as steel, but can be made of any suitable material.

Figure 4:
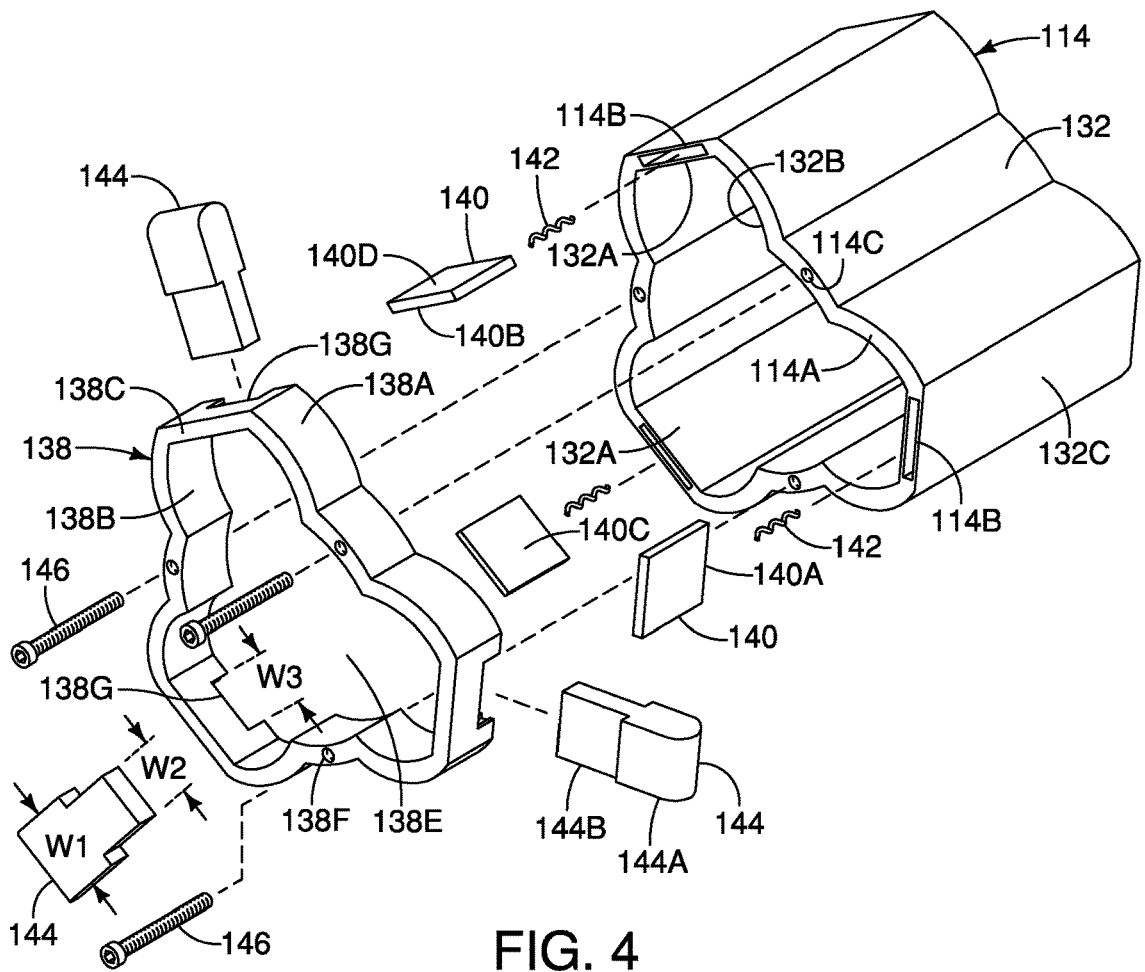
FIG. 4 is an exploded perspective view of an outer race and a cap of the joint assembly of FIG. 2.

A free end of the wall 132 defines an axial face 114A of the outer race 114, as shown in FIGS. 3 and 4. A plurality of first slots 114B extend axially inwardly from the axial face 114A of the outer race 114. The slots 114B are disposed between the inner surface 132B and an outer surface 132C of the wall 132. The slots 114B are preferably disposed in the portion of the wall 132 in which the grooves 132A are formed. The number of slots 114B is equal to the number of rollers 128 of the fitting 112. A plurality of fastener openings 114C extend axially inwardly from the axial end face 114A of the outer race 114. The fastener openings 114C extend inwardly between the inner surface 132B and the outer surface 132C of the wall 132. The fastener openings 114C are preferably disposed between adjacent slots 114B. The number of fastener openings 114C is preferably equal to the number of slots 114B in the outer race 114. As shown in FIGS. 3 and 4, the outer race 114 is shown having three slots 114B and three fastener openings 114C, although the outer race 114 can have any suitable number of slots 114B and fastener openings 114C.

Figure 10:
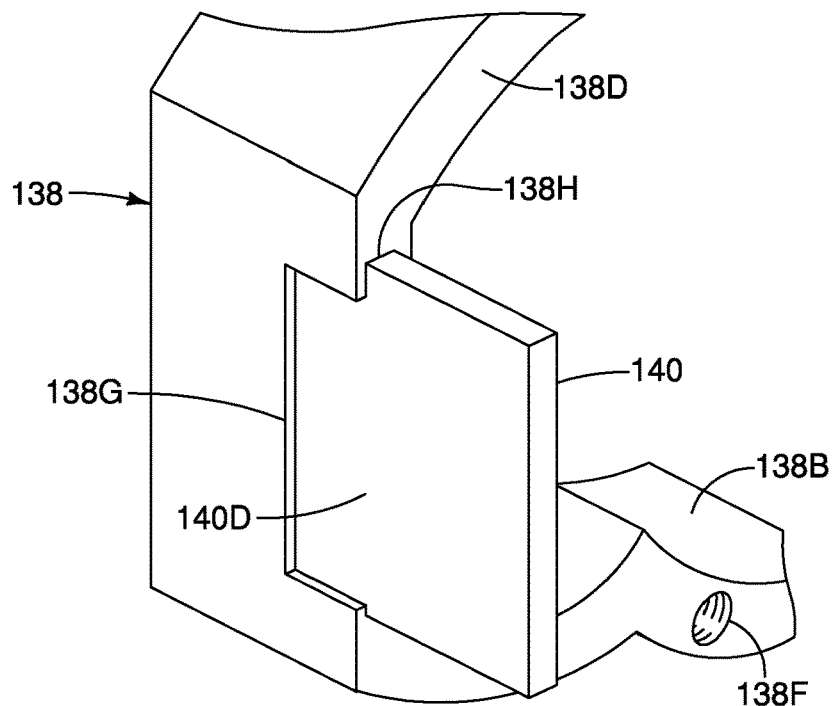
FIG. 10 is perspective view of the cap receiving a gate after removal of the stop member with the outer race removed for clarity.
Figure 11:
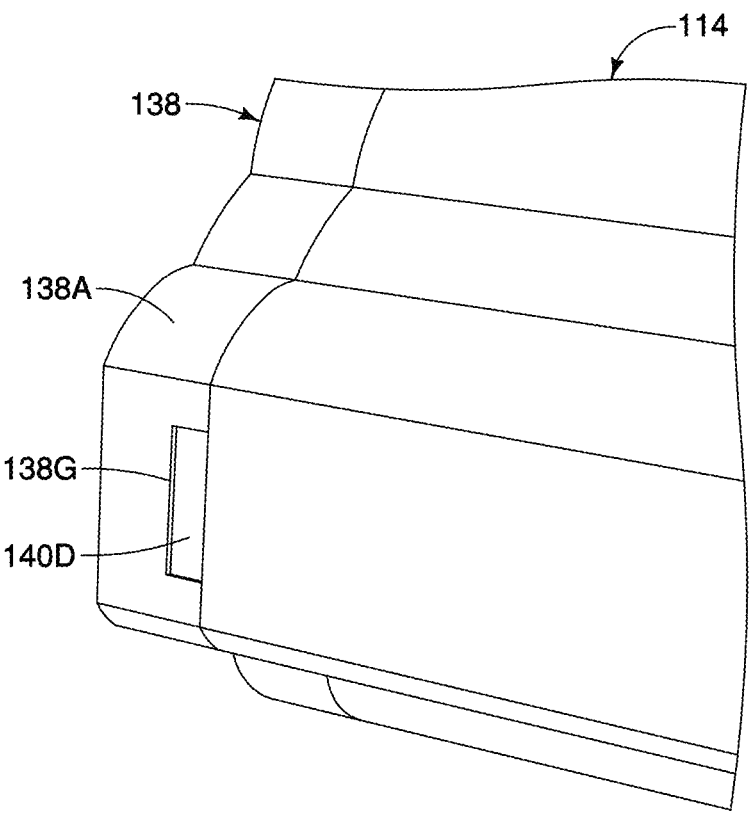
FIG. 11 is a perspective view of the cap receiving the gate of FIG. 10 with the outer race connected to the cap.

A cap 138 is configured to be connected to the outer race 114, as shown in FIGS. 2, 4 and 11. The cap 138 has a shape substantially corresponding to a shape of the outer race 114 when viewed in the axial direction along the rotational axis A. The cap 138 has an outer surface 138A and an inner surface 138B. The cap includes a first axial face 138C and a second axial face 138D that face in the axial direction, as shown in FIGS. 4 and 6-11. An opening 138E is defined by the inner surface 138B and extends through the cap 138 in the axial direction from the first axial face 138C to the second axial face 138D. The cap 138 is preferably made of a metallic material, such as steel, but can be made of any suitable material.

A plurality of fastener openings 138F extend axially through the cap 138 from the first axial face 138C to the second axial face 138D, as shown in FIGS. 4 and 6-10. Each of the plurality of fastener openings 138F in the cap 138 corresponds to one of the plurality of fastener openings 114C in the outer race 114. The cap 138 preferably has the same number of fastener openings 138F as the number of fastener openings 114C in the outer race 114.

A plurality of recesses, or openings, 138G are formed in the cap 138, as shown in FIGS. 4 and 6-11. The recesses 138G extend through the cap 138 from the outer surface 138A to the inner surface 138B.

Figure 7:
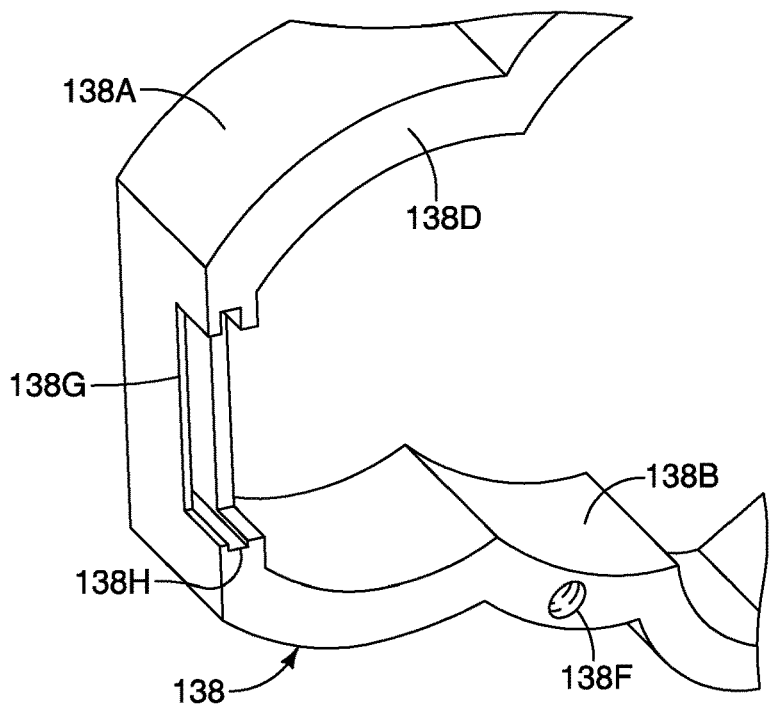
FIG. 7 is a perspective view of the cap of FIG. 6.

A plurality of second slots 138H extend in the axial direction from the second axial face 138D toward the first axial face 138C, as shown in FIGS. 7-10. The slots 138H do not extend completely to the first axial face 138C. The slots 138H extend through the recesses 138G, as shown in FIGS. 7 and 10.

A gate 140 is configured to be movably received by each of the first slots 114B in the outer race 114, as shown in FIGS. 2, 4, 10 and 11. The gate 140 has a first end 140A and a second end 140B opposite the first end 140A. The second end 140B of the gate 140 is closer to the cap 138 then the first end 140A when the gate 140 is received by the first slot 114B in the outer race 114, as shown in FIG. 2. The gate 140 has an inner surface 140C facing toward the rotational axis A, and an outer surface 140D facing away from the rotational axis A. The gate is preferably made of a metallic material, such as steel, but can be made of any suitable material.

A biasing member 142 is configured to be disposed in the first slot 114B in the outer race 114, as shown in FIGS. 2 and 4. A first end of the biasing member 142 contacts an end of the slot 114B. A second end of the biasing member 142 contacts the first end 140A of the gate 140. The biasing member 142 is configured to bias the gate 140 in the axial direction.

A stop member 144 is configured to be removably received by the cap 138, as shown in FIGS. 2 and 8-11. The stop member 144 has a first portion 144A and a second portion 144B. A width W1 of the first portion 144A is larger than a width W2 of the second portion 144B, as shown in FIG. 4. The stop member 144 is preferably unitarily formed as a one-piece member. The stop member is preferably made of a non-metallic material, such as nylamid, but can be made of any suitable material.

A fastener 146 is configured to secure the cap 138 to the outer race 114, as shown in FIGS. 2 and 4. The fastener 146 is received by the fastener opening 138F in the cap 138 and the fastener opening 114C in the outer race 114. The fastener openings 138F in the cap 138 and the fastener openings 114C in the outer race 114 are preferably threaded.

Figure 5:
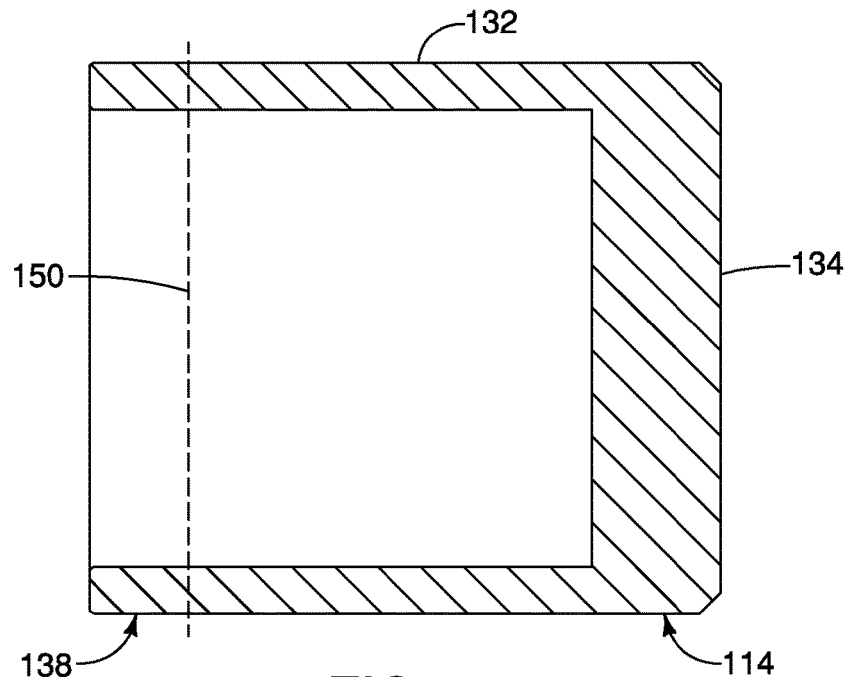
FIG. 5 is an elevational view of a member from which an outer race and a cap of the joint assembly are manufactured.

As shown in FIG. 5, the cap 138 can be formed by cutting the outer race 114. A cut is made along line 150 to form the cap 138. The cut line 150 is preferably substantially parallel to the base 134 of the outer race 114.

Figure 6:
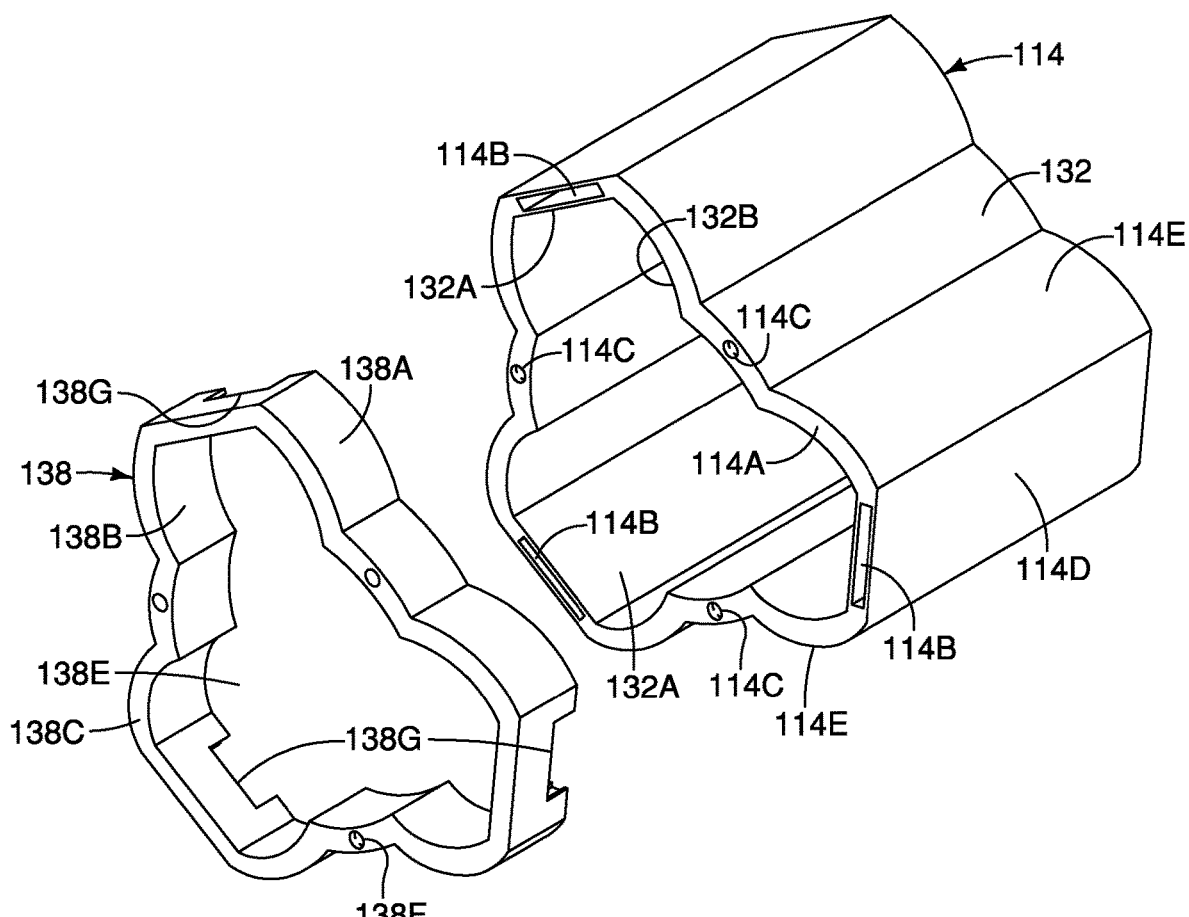
FIG. 6 is a perspective view of the outer race and the cap of the joint assembly of FIG. 5.

After separating the cap 138 from the outer race 114, as shown in FIG. 6, the plurality of first slots 114B and fastener openings 114C are machined in the axial face 114A of the outer race 114. As shown in FIGS. 6 and 7, the plurality of recesses 138G are machined in the cap 138. The plurality of second slots 138H are machined in the second axial face 138D of the cap 138. The plurality of fastener openings 138F are machined in the cap 138. The plurality of first slots 114B in the outer race 114 and the plurality of second slots 138H in the cap 138 are axially aligned. The plurality of fastener openings 114C in the outer race 114 and the plurality of fastener openings 138F in the cap 138 are axially aligned. The plurality of second slots 138H in the cap 138 extend through the plurality of recesses 138G, as shown in FIG. 7.

Figure 8:
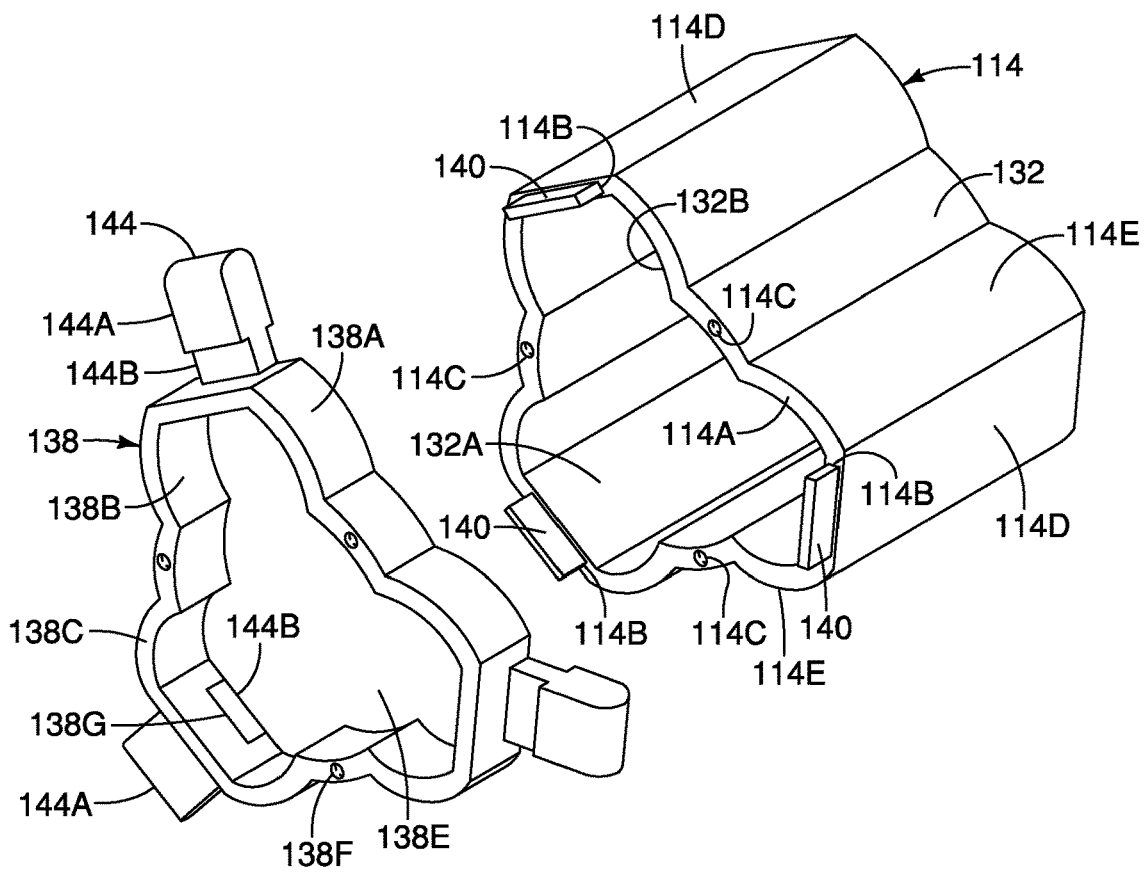
FIG. 8 is a perspective view of a stop member being inserted in the cap of FIG. 6.
Figure 9:
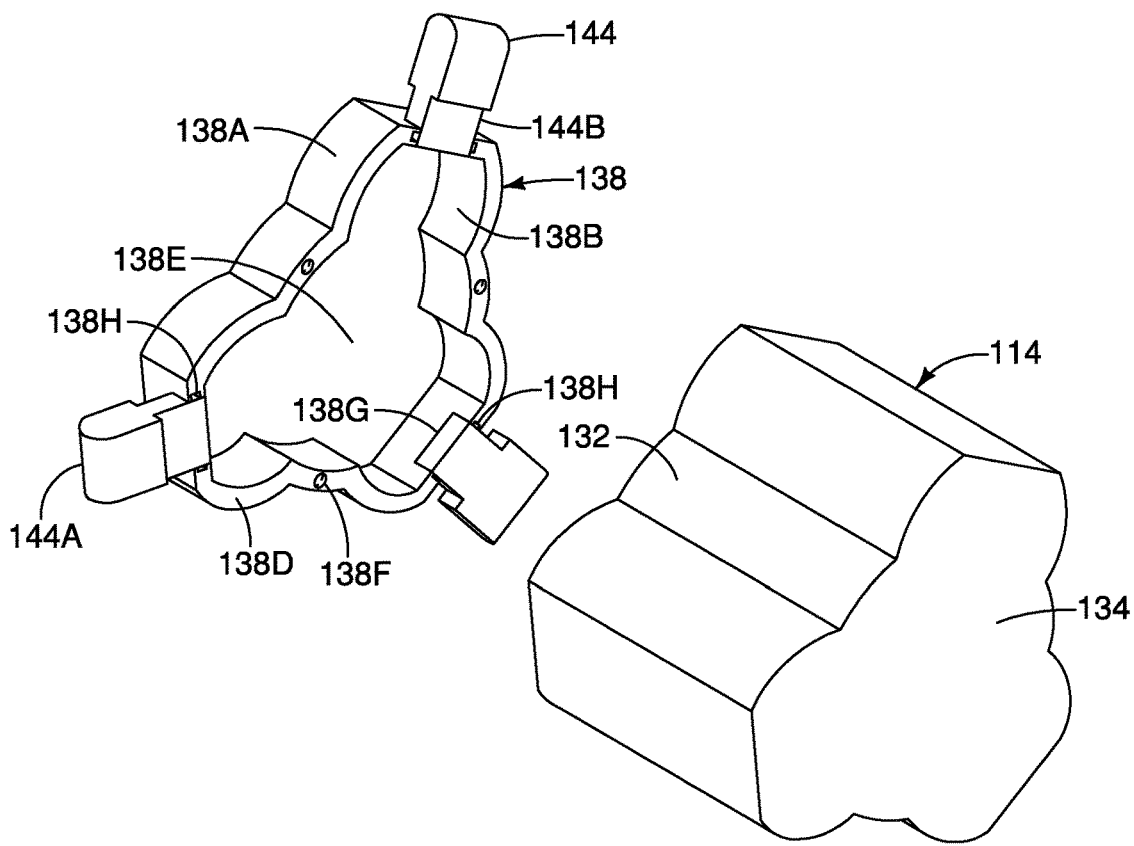
FIG. 9 is a rear perspective view of the outer race and the cap of FIG. 8.

Referring to FIGS. 2, 4 and 8, a biasing member 142 and a gate 140 are inserted in each of the plurality of slots 114B in the outer race 114. The biasing member 142 is disposed in the slot in any suitable manner. A first end of the biasing member 142 contacts an end wall of the slot 114B and a second end of the biasing member 142 contacts the first end 140A of the gate 140. The biasing member 142 biases the gate 140 in a direction toward the cap 138.

The fitting 112 is disposed in the receiving area 136 of the outer race 114, as shown in FIG. 3. The slots 114B are disposed in a substantially planer portion 114D of the wall 132 of the fitting 112. Curved portions 114E of the wall 132 immediately adjacent each planar portion 114D are curved to accommodate the roller 128 of the fitting, as shown in FIG. 3. The curved portions 114E of the wall 132 allow the rollers 128 to rotate, such that the fitting 112 can move axially within the receiving area 136 of the fitting 112. The curved portions of the wall 132 further prevent rotation of the fitting 112 relative to the outer race 114, such that rotation of the outer race 114 rotates the fitting 112. As shown in FIG. 2, the fitting 112 moves axially in the outboard direction O and the inboard direction I. The fitting 112 is axially movable and rotationally fixed relative to the outer race 114.

The drive shaft 116 is inserted in the opening 124 in the yoke 122 such that the splines 116A of the drive shaft 116 engage the splines disposed on the inner surface 122A of the yoke 122. Rotation of the outer race 114 through shaft 152, as shown in FIGS. 2 and 3, rotates the fitting 112, which in turn rotates the drive shaft 116. Rotation of the drive shaft rotates a wheel (not shown) of the vehicle.

The cap 138 is positioned adjacent the outer race 114 such that the second axial face 138D of the cap 138 is adjacent the axial face 114A of the outer race 114, as shown in FIGS. 2, 4, 8, 9 and 11. The fastener holes 138F in the cap 138 are aligned with the fastener holes 114C in the outer race 114. This position also results in the first slots 114B in the outer race 114 being aligned with the second slots 138H in the cap 138. The fasteners 146 are inserted through the fastener openings 138F in the cap 138 and into the fastener openings 114C in the outer race 114 to securely fasten the cap 138 to the outer race 114.

The second portion 144B of the stop member 144 is inserted through the recess 138G in the cap 138. The first portion 144A of the stop member 144 has a width W1 that is larger than the width W3 of the recess 138G in the cap to limit the insertion depth of the stop member 144. The second end 140B of the gate 140 is biased to contact the second portion 144B of the gate 140, as shown in FIG. 2. The biasing member 142 biases the gate 140 to a first position contacting the stop member 144 when the stop member 144 is received by the cap 138. The stop member 144 is removably received by the cap 138. The force exerted by the gate 140 on the stop member 144 facilitates securely retaining the stop member 144 between the outer race 114 and the cap 138. As shown in FIG. 11, the recess 138G is an opening disposed in the second axial face 138D of the cap 138 such that the stop member 144 is disposed between the cap 138 and the outer race 114. Alternatively, the recess 138 can be an opening disposed entirely within the cap 138.

The boot 118 is connected to the drive shaft 116 and to the end cap 138, as shown in FIG. 2 in a conventional manner. A lubricating material 121, such as grease, is disposed in the cavity 120 defined by the boot 118, the end cap 138 and the outer race 114. The boot 118 is preferably made of a flexible material that flexes to accommodate movement of the drive shaft 116 relative to the outer race 114.

The second portion 144B of the stop member 144 is contacted by the fitting 112 to limit axial movement of the fitting 112 in the outboard direction O. Prior to finalizing assembly of the vehicle, the stop member 144 substantially prevents axial movement of the fitting 112 in a direction toward the cap 138. By limiting axial movement of the fitting 112 in the outboard direction O, the fitting 112 is substantially prevented from contacting the boot 118.

Figure 12:
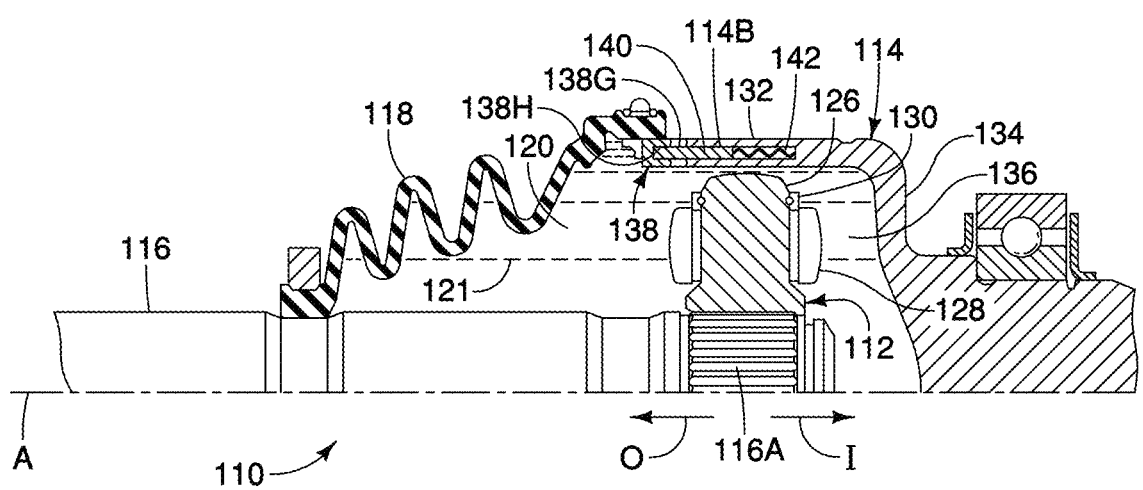
FIG. 12 is an elevational view in cross section of the joint assembly of FIG. 2 with the stop member removed.

When assembly of the vehicle is finalized, each of the stop members 144 is removed from the cap 138, as shown in FIGS. 10-12. The biasing member 142 moves the gate 140 in the outboard direction O to a second position to seal the recess 138G in the cap 138 when the stop member 144 is removed. The movement direction of the gate 140 is substantially perpendicular to the removal direction of the stop member 144. The gate 140 moves in the inboard direction O when the stop member 144 is removed, and the stop member 144 is removed in a direction perpendicular to the inboard direction O. The gate 140 moves into the slot 138H in the cap 138. A portion of the gate 140 is received in the first slot 114B of the outer race 114 and the second slot 138H of the cap 138 to close the recess 138G in the cap 138 to substantially prevent leakage of the lubricating material 121 (FIG. 2) and to substantially prevent debris and other foreign materials from entering the cavity 120 upon removal of the stop member 144. The biasing member 142 maintains the gate 140 in the second position to seal the recess 138G in the cap 138.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the hybrid door seal. Accordingly, these terms, as utilized to describe the present invention should be interpreted relative to a vehicle equipped with the hybrid door seal.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A joint assembly for a vehicle comprising:
an outer race;
a fitting disposed in the outer race, the fitting being configured to be axially movable and rotationally fixed relative to the outer race;
a cap connected to the outer race;
a stop member removably received by the cap, the stop member substantially preventing axial movement of the fitting in a direction toward the cap; and
a gate movably received by a first slot in the outer race, an opening in the cap removably receiving the stop member.

2. The joint assembly according to claim 1, wherein
a biasing member is configured to bias the gate to a first position contacting the stop member when the stop member is received by the cap.

3. The joint assembly according to claim 2, wherein
the biasing member is configured to move the gate to a second position covering the opening in the cap when the stop member is removed.

4. The joint assembly according to claim 3, wherein
a second slot in the cap is aligned with the first slot in the outer race, the second slot being configured to receive the gate when the gate is in the second position.

5. The joint assembly according to claim 1, wherein
a fastener secures the cap to the outer race.

6. The joint assembly according to claim 1, wherein
the fitting has an opening configured to receive a shaft.

7. The joint assembly according to claim 1, wherein
the stop member is made of a non-metallic material.

8. The joint assembly according to claim 1, wherein
the gate is made of a metallic material.

9. The joint assembly according to claim 1, wherein
the stop member has a first portion and a second portion, a width of the first portion being larger than a width of the second portion, the width of the first portion being larger than a width of the opening to limit insertion of the stop member in the cap.

10. A joint assembly for a vehicle comprising:
an outer race;
a fitting disposed in the outer race, the fitting having a splined opening, the fitting being configured to be axially movable and rotationally fixed relative to the outer race;
a cap connected to the outer race;
a stop member removably received by the cap, the stop member substantially preventing axial movement of the fitting in a direction toward the cap;
a gate movably received by a first slot in the outer race;
a biasing member biases the gate to a first position contacting the stop member when the stop member is received by the cap;
a splined shaft received by the opening in the fitting;
a boot having a first end connected to the shaft and a second end connected to the cap; and
a lubricating material disposed in a cavity defined by the shaft, the outer race, the cap and the boot.

11. The joint assembly according to claim 10, wherein
an opening in the cap removably receives the stop member.

12. The joint assembly according to claim 11, wherein
the stop member has a first portion and a second portion, a width of the first portion being larger than a width of the second portion, the width of the first portion being larger than a width of the opening to limit insertion of the stop member in the cap.

13. The joint assembly according to claim 10, wherein
the gate is movably received by a first slot in the outer race.

14. The joint assembly according to claim 10, wherein
the biasing member is configured to move the gate to a second position covering the opening in the cap when the stop member is removed to substantially prevent leakage of the lubricating material.

15. The joint assembly according to claim 14, wherein
a movement direction of the gate is substantially perpendicular to a removal direction of the stop member.

16. The joint assembly according to claim 14, wherein
a second slot in the cap is aligned with the first slot in the outer race, the second slot being configured to receive the gate when the gate is in the second position.

17. The joint assembly according to claim 10, wherein
the stop member is made of a non-metallic material.

18. The joint assembly according to claim 10, wherein
the gate is made of a metallic material.

* * * * *